United States Patent
Takeda et al.

(10) Patent No.: US 11,317,307 B2
(45) Date of Patent: Apr. 26, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 57 days.

(21) Appl. No.: 16/632,499

(22) PCT Filed: Jul. 21, 2017

(86) PCT No.: PCT/JP2017/026516
§ 371 (c)(1),
(2) Date: Jan. 20, 2020

(87) PCT Pub. No.: WO2019/016950
PCT Pub. Date: Jan. 24, 2019

(65) Prior Publication Data
US 2020/0205228 A1 Jun. 25, 2020

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0053* (2013.01); *H04L 1/0026* (2013.01); *H04L 1/1819* (2013.01);
(Continued)

(58) Field of Classification Search
CPC ...... H04W 24/10; H04W 8/24; H04L 1/0026; H04L 1/0027; H04L 5/0057; H04L 5/0083; H04L 5/0091
See application file for complete search history.

(56) References Cited

U.S. PATENT DOCUMENTS 9,686,703 B2 * 6/2017 Kim .................. H04W 76/28
2011/0019637 A1 * 1/2011 Ojala .................. H04L 1/0026
370/329
(Continued)

FOREIGN PATENT DOCUMENTS

| CN | 104380649 A | 2/2015 |
| JP | 2015-508265 A | 3/2015 |

(Continued)

OTHER PUBLICATIONS

International Search Report issued in PCT/JP2017/026516 dated Aug. 29, 2017 (5 pages).
(Continued)

*Primary Examiner* — Kevin C. Harper
(74) *Attorney, Agent, or Firm* — Osha Bergman Watanabe & Burton LLP

(57) ABSTRACT

A terminal is disclosed including a receiver that receives downlink control information that triggers channel state information (CSI) reporting using an uplink shared channel; and a processor that controls the CSI reporting based on a given value and transmission timing of at least one of the uplink shared channel and a delivery acknowledgement signal (HARQ-ACK). In other aspects, a radio communication method for a user terminal is also disclosed.

4 Claims, 8 Drawing Sheets

(51) Int. Cl.
    *H04L 1/00*         (2006.01)
    *H04L 1/18*         (2006.01)
    *H04W 8/24*       (2009.01)
    *H04W 88/06*     (2009.01)

(52) U.S. Cl.
    CPC ............ *H04L 5/0055* (2013.01); *H04W 8/24* (2013.01); *H04W 88/06* (2013.01)

(56) References Cited

U.S. PATENT DOCUMENTS

| | | | |
|---|---|---|---|
| 2013/0083748 A1* | 4/2013 | Li | H04L 5/001 370/329 |
| 2013/0258965 A1 | 10/2013 | Geirhofer et al. | |
| 2014/0078919 A1 | 3/2014 | Hammarwall | |
| 2015/0043461 A1 | 2/2015 | Sachs et al. | |
| 2019/0141677 A1* | 5/2019 | Harrison | H04W 72/04 |
| 2019/0288812 A1* | 9/2019 | Chen | H04L 5/005 |
| 2019/0349034 A1* | 11/2019 | Manolakos | H04B 7/0632 |
| 2020/0036424 A1* | 1/2020 | Kang | H04B 7/06 |
| 2020/0169364 A1* | 5/2020 | Hao | H04L 5/14 |
| 2020/0177254 A1* | 6/2020 | Lee | H04W 76/27 |
| 2021/0385047 A1 | 12/2021 | Hammarwall | |

FOREIGN PATENT DOCUMENTS

| | | |
|---|---|---|
| JP | 2015-521420 A | 7/2015 |
| WO | 2013169197 A1 | 11/2013 |

OTHER PUBLICATIONS

Written Opinion of the International Searching Authority ssued in PCT/JP2017/026516 dated Aug. 29, 2017 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)"; Mar. 2010 (149 Pages).

Extended European Search Report issued in counterpart European Patent Application No. 17918244.9, dated Feb. 9, 2021 (8 pages).

Qualcomm Incorporated; "Shortened Processing Time for Uplink 1ms TTI"; 3GPP TSG RAN WG1 #86, R1-166308; Gothenburg, Sweden, Aug. 22-26, 2016 (4 pages).

Office Action in counterpart Chilean Patent Application No. 202000171 dated Jun. 15, 2021 (17 pages).

NTT Docomo, Inc.; "CSI feedback for shortened TTI with shortened processing time"; 3GPP TSG RAN WG1 Meeting #89, R1-1708421; Hangzhou, P R. China; May 15-19, 2017 (7 pages).

Office Action in counterpart Japanese Patent Application No. 2019-530336 dated Sep. 14, 2021 (8 pages).

Office Action issued in Chinese Application No. 201780093440.8; dated Feb. 15, 2022 (14 pages).

Office Action issued in European Application No. 17918244.9; dated Feb. 22, 2022 (5 pages).

\* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE (referred to as, for example, "LTE-A (LTE-Advanced)," "FRA (Future Radio Access)," "4G," "5G," "5G+ (plus)," "NR (New RAT (New Radio Access Technology))," "LTE Rel. 14," "LTE Rel. 15 (or later versions)," and so on) are under study for the purpose of achieving further broadbandization and increased speed beyond LTE.

In existing LTE systems (for example, LTE Rel. 13 and earlier versions), downlink (DL) and/or uplink (UL) communication are carried out by using 1-ms transmission time intervals (TTIs) (also referred to as "subframes" and so on). This 1-ms TTI is the unit of time it takes to transmit 1 channel-encoded data packet, and is the processing unit in, for example, scheduling, link adaptation, retransmission control (HARQ-ACK (Hybrid Automatic Repeat reQuest-ACKnowledgment)) and so on. The 1-ms TTI contains 2 slots.

Also, in existing LTE systems (for example, LTE Rel. 8 to 13), a base station (eNB (eNode B)) controls the power and scheduling of a user terminal (UE (User Equipment)) based on information reported from the UE. For example, the base station controls the power of the UE based on the power headroom (also referred to as "PH") reported from the UE. The UE includes the PH in a power headroom report (PHR) and transmits this. Also, the base station controls the conditions of scheduling and the like for the UE based on channel state information (also referred to as "CSI") reported from the UE. The UE includes CSI in uplink control information (UCI) and transmits this.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14 or 15, 5G, NR, etc.), research is underway to introduce time units (for example, TTIs that are shorter than 1-ms TTIs (and that are also referred to as "shortened TTIs," "short TTIs," "sTTIs," "slots," "minslots" and so forth)) having different time lengths than the 1-ms time units used in existing LTE systems (also referred to as "subframes," "TTIs," and so on).

For example, given that time units that are different than existing LTE systems will be introduced, it is likely that the data scheduling timing (for example, the period from a UL grant to UL data transmission, and the like) is configured shorter than heretofore. Alternatively, it is also likely that the timing for transmitting delivery acknowledgment signals (also referred to as "HARQ-ACK," "ACK/NACK," "A/N," etc.) in response to data, as feedback, will be configured shorter than heretofore.

Meanwhile, when UE transmits given information (for example, PHR, CSI, etc.), the UE generates and transmits the given information after transmission of this given information is commanded (triggered). In this case, depending on what processing capabilities (for example, the processing time it takes to calculate and/or generate the given information) are required of the UE to generate the given information, the UE may not be able to transmit the given information properly by using the same mechanism (for example, the timing, etc.) as heretofore.

Unless PHR, CSI and/or others are properly reported from the UE to the base station, proper UL transmission power control and/or scheduling control are not possible, and a decline in the quality of communication might arise as a problem.

The present invention has been made in view of the above, and it is therefore an object of the present invention to provide a user terminal and a radio communication method, whereby the decline in the quality of communication can be prevented even when time units that are shorter than existing systems are introduced.

Solution to Problem

According to one aspect of the present invention, a user terminal has a receiving section that receives a DL signal and a control section that controls transmission of a UL channel, which is scheduled a first period after the DL signal is received, and transmission of given information, and, in this user terminal, based on the first period and a second period, which is needed to generate the given information, at least one of whether or not to transmit the given information by using the UL channel, content of the given information to transmit in the UL channel, and the first period is controlled.

Advantageous Effects of Invention

According to the present invention, it is possible to prevent the decline in the quality of communication time units that are shorter than existing systems are introduced.

DESCRIPTION OF EMBODIMENTS

Figure 1:
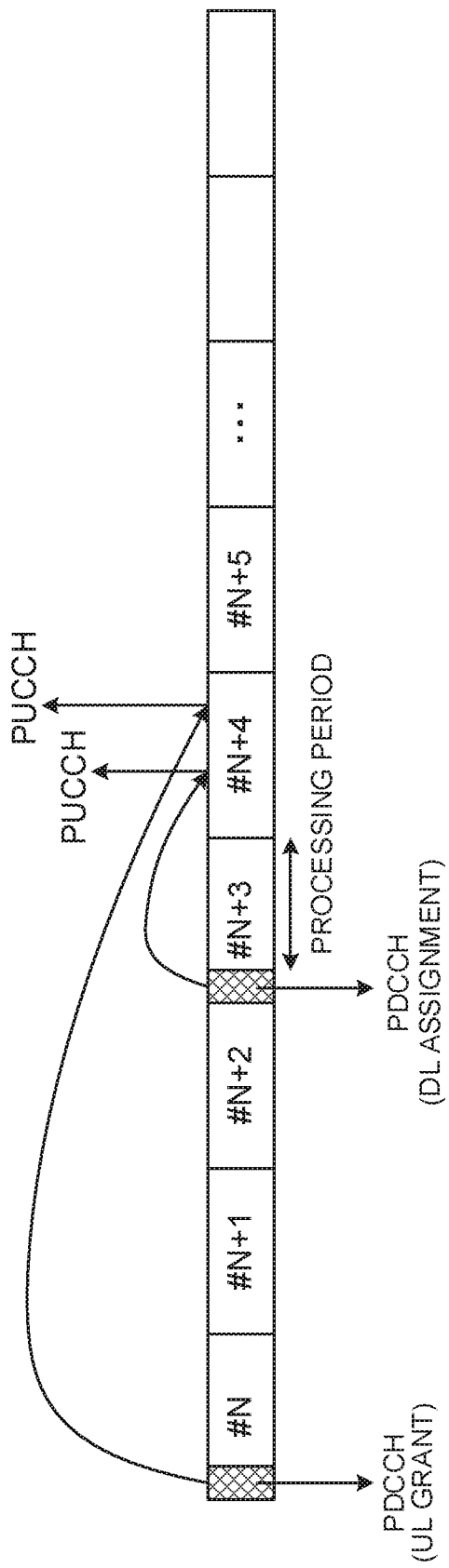
FIG. 1 is a diagram to explain the timing for transmitting PUSCH/PUCCH and reporting of PH.

Also, given that multiple numerologies and the like are likely to be supported in future radio communication systems, studies are in progress to support time units (also referred to as, for example, "subframes," "slots," "mini-islots," "subslots," "transmission time intervals (TTIs)," "radio frames" and so on) that are the same as and/or different from those of existing LTE systems (LTE Rel. 13 or earlier versions).

For example, a subframe is a time unit having a given time length (for example, 1 ms) regardless of which numerology a user terminal uses. On the other hand, slots may be defined as units of time that depend on what numerology a user terminal uses. For example, if the subcarrier spacing is 15 kHz or 30 kHz, the number of symbols per slot may be 7 or 14. Meanwhile, when the subcarrier spacing is 60 kHz or greater, the number of symbols per slot may be 14. In addition, a slot may include a plurality of minislots (subslots).

Provided that different time units than existing LTE systems will be introduced, it may be possible to control the transmission and/or receipt of signals and/or channels by applying multiple time units to the steps of data processing such as scheduling (also referred to as "processing types"). As an example, it may be possible to control the steps of processing by using a first time unit (for example, the slot unit) and a second time unit (for example, the symbol unit or the minislot unit), which is shorter than the first time unit.

When using the first time unit (for example, the slot unit), the timing for transmitting data and/or HARQ-ACK is controlled in slot units. For example, in slot-based scheduling, the UE and/or the base station control the HARQ-ACK in response to the DL data received in slot #N to be transmitted as feedback in slot #N+K1. In this case, it is likely that all UEs support K1≥1. Note that the configuration may be employed here in which some UEs support K1=0.

For example, in slot-based scheduling, the UE and/or the base station control the HARQ-ACK in response to the DL data received in slot #N to be transmitted as feedback in slot #N+K2. In this case, it is likely that all UEs support K1≥2. Note that the configuration may be employed here in which some UEs support K2=0.

When using a second time unit (for example, the symbol unit), it is necessary to take into account the processing time by the UE in symbol units, not in slot units. For example, the timing for transmitting delivery acknowledgment signals (HARQ-ACK, A/N, etc.) in response to DL data as feedback and the timing for scheduling UL data in response to UL grants is controlled in units of symbols. In this case, the processing Lime for generating UL data and/or HARQ-ACK in the UE needs to be controlled in symbol units (N1 and N2), instead of slot units (K).

Here, N1 refers to the number of symbols that the UE has to process, after DL data (PDSCH) is received in the UE, by the earliest time the A/N transmission in response to the PDSCH can be started. N2 refers to the number of symbols that the UE has to process, after downlink control information to carry a UL transmission command (UL grant) is received, by the earliest time the UL data (PUSCH) transmission scheduled by the UL grant can be started. Note that N1 may be considered the number of symbols required in the A/N transmission process, and N2 may be considered the number of symbols required in the UL data transmission process.

A configuration may be employed here in which N1 and/or N2 (hereafter also referred to as "N1/N2") do not contain other time information such as timing advance (TA). Alternatively, a configuration may be employed here in which some time information (for example, UL/DL switching time in the UE) is included in N1/N2.

Furthermore, N1/N2 may be values that are configured in advance, or may be reported from the UE, as its capability information, to the base station. When N1/N2 are configured in advance, N1/N2 may be reported to the UE, in advance, by using higher layer signaling and/or the like, or N1/N2 may be defined in the specification on a fixed basis.

Now, in existing LTE, UE transmits a PHR, which contains PH information per serving cell, to an eNB, as feedback. This PHR is transmitted via MAC signaling, by using the PUSCH. To be more specific, a PHR is constituted by PHR MAC CEs (Control Elements) contained in MAC PDU (Protocol Data Unit). The eNB can control UE's uplink transmission power, dynamically, based on PHRs. Note that the PH information may be the value of PH, or may be an index that is associated with the value (or the level) of PH.

A PHR includes, for example, a PH, which is information to represent the difference between the total transmission power of the user terminal and the maximum allowable transmission power, and a PH, which is information to represent the difference between the transmission power of the user terminal per CC and the maximum allowable transmission power per CC.

Presently, 2 types of PHs (type 1 PH and type 2 PH) are specified. Type 1 PH (PH type 1) is the PH based on the power of the PUSCH alone (assuming that only the PUSCH is transmitted). Also, type 2 PH (PH type 2) is the PH based on the power of both the PUSCH and the PUCCH (assuming that the PUSCH and the PUCCH are transmitted simultaneously). Existing LTE systems set forth PH type 1 and PH type 2 be calculated using a predetermined algorithm.

The eNB may transmit PHR configuration information, which relates to the conditions for transmitting PHRs, to the UE. This information may be reported, for example, via RRC signaling. The UE judges the timing for transmitting a PHR based on the PHR configuration information reported. That is, a PHR is triggered when the PHR transmission conditions are met.

Here, for example, 2 timers (a periodic PHR timer and a prohibit PHR timer) and a path loss change threshold (d1-PathlossChange) can be used for the PHR configuration information. For example, when the first timer (prohibit PHR timer) expires and shows that the path loss value on the downlink has changed from the value upon previous PHR transmission by more than the path loss change threshold (d1-PathlossChange), a PHR is triggered. Also, when the second timer (periodic PHR timer) expires, a PHR is triggered. Note that the method of triggering a PHR is not limited to these. For example, triggering of PHRs may be controlled by explicit and/or implicit reporting.

Furthermore, for CCs where UL transmission takes place, the UE reports information about the PH (real PH) that takes the actual transmission power into account, and, for CCs where UL transmission does not take place, information about the PH (virtual PH) that does not depend on the PUSCH bandwidth. A PHR to include a real PH may be referred to as a "real PHR," and a PHR to include a virtual PHR may be referred to as a "virtual PHR." The eNB can control the power of the UE, by taking into account the uplink transmission power for non-transmitting CCs as well as transmitting CCs, by receiving information related to real PHRs and virtual PHRs.

Also, existing LTE systems support aperiodic CSI reporting, in which a user terminal transmits channel state information (CSI) in response to a transmission command from a radio base station. This transmission-commanding information (transmission command information, which hereinafter will be referred to as an "A-CSI trigger") is included in downlink control information (DCI), which is transmitted in a downlink control channel. DCI to carry an A-CSI trigger may be used for scheduling an uplink shared channel (PUSCH (Physical Uplink Shared CHannel)), and may be also referred to as "DCI format 0 or 4," an "uplink scheduling grant (hereinafter referred to as an "uplink grant")," and so on.

In aperiodic CSI reporting (A-CSI), a user terminal transmits CSI in response to an A-CSI trigger contained in a UL grant, by using the PUSCH specified by that, UL grant. For example, based on an A-CSI trigger contained in a UL grant, the UE includes CSI in the PUSCH to transmit a given period later (for example, 4 ms later), and transmits this. CSI to be transmitted in response to an A-CSI trigger may be referred to as an "aperiodic CSI (A-CSI)" and/or the like. This CSI includes at least one of a channel quality indicator (CQI), a pre-coding matrix indicator (PMI) and a rank indicator (RI).

In this way, in existing LTE systems, given information such as PHRs and CSI are reported from UE to a base station, so that based on the information received, the base station can properly perform at least one of scheduling, resource allocation and transmission power control.

Meanwhile, as explained earlier, in future radio communication systems, it is anticipated that different time units than existing LTE systems will be introduced, and, accompanying this, the timing for transmitting data and/or HARQ-ACK and the like will be configured shorter than heretofore. Also, in future radio communication systems, it may be also possible that the base station will change and control the timing for transmitting UL data and the timing for transmitting HARQ-ACK, in a dynamic manner, in order to configure transmission timings and transmission periods more flexibly.

For example, FIG. 1 shows a case where UL data (PUSCH) transmission is scheduled in slot #N+4, by downlink control information (DCI) that is transmitted in a given time unit (here, slot #N). Furthermore, FIG. 1 shows a case where the A/N (PUCCH) in response to the DL data (PDSCH) of slot #N+3 is transmitted in slot #N+4. Here, a case is shown in which PUSCH-PUCCH simultaneous transmission (for example, PCell) takes place in slot #N+4.

When PH is reported in the same manner as in existing systems, UE calculates (generates) PH type 2, at least with respect to the PCell, and transmits this in slot #N+4.

However, if the base station configures the transmission timing and the transmission period more flexibly, there is a threat that the UE cannot calculate PH because there is not enough time for this calculation before the slot in which the UE is supposed to report the PH. For example, referring to FIG. 1, there is a possibility that PH cannot be calculated by slot #N+4, depending on the UE's capabilities.

Furthermore, studies are in progress to ease the requirement for reporting PH in certain cases. These cases include, for example, the case where the UE needs to wait for the result of another process (for example, PDSCH decoding) before configuring the MAC PDU for transmitting a type 2 PHR. In this case, referring to FIG. 1, although the UE needs to calculate a type 2 PH, after having decoded the PDSCH of slot #N+3, the UE may have difficulty calculating and transmitting the PH by slot #N+4, depending on the UE's processing capabilities.

The same is true for channel state information (A-CSI), and, when the period from receiving A-CSI-triggering DCI (+PUSCH scheduling) to transmitting a PUSCH is short, the processing time it takes for the UE to generate channel state information cannot be reserved. In this case, it is difficult to include and transmit CSI in the PUSCH.

So, the present inventors have focused on the point that the processing time it takes for UE to calculate (or generate) given transmitting information may vary per UE, and come up with the idea of controlling the timing for transmitting (for example, scheduling) data, HARQ-ACK, and so on, taking into account the above processing time. Also, the present inventors have come up with the idea of controlling whether or not to transmit given information and/or what content is transmitted, based on the processing time for the given information and the timing (for example, scheduled timing) for transmitting data and/or HARQ-ACK.

Now, embodiments of the present invention will be described below in detail with reference to the accompanying drawings. Note that the radio communication methods according to the herein-contained embodiments may be applied individually or may be applied in combination. Note that, in the following description, PHRs and CSI will be described as examples of given information reported by UE, the given information that can be used in the present embodiment is not limited to these, and other signals and/or channels may be used. Also, in the following description, CSI may be read as "CSI process."

First Example

With a first example of the present invention, a case will be described below, in which the timing for transmitting UL data and/or HARQ-ACK and so on are controlled based on information about UE's processing capabilities for given information. The information about UE's processing capabilities refers to information including information about the processing time (for example, the number of symbols and/or the absolute time (its)) required to calculate (or generate) given information.

A user terminal (UE) transmits information about the processing time required for given information to a base station in units smaller than slots (for example, in symbol units). The processing time for given information may be the time that is required to calculate (or generate) the given information, or may be the time required to transmit the given information. For example, the UE transmits the number of symbols (for example, N3) to match the PH processing time, to the base station, as UE capability information. For example, the UE transmits the number of symbols (for example, N3) to match the CSI processing time, to the base station, as UE capability information.

That is, N3 and/or N4 (hereafter, also referred to as "N3/N4") indicate the number of OFDM symbols which, when PHR and/or CSI (hereinafter also referred to as "PHR/CSI") reporting is triggered, the UE needs to process after scheduling information is all received, up to the earliest start position where UL data (PUSCH) transmission can be started.

For information about the processing time required for given information, the UE may report the value of the processing time (absolute time), in addition to the number of symbols to match the processing time, to the base station. Also, the UE may transmit information about the processing times required for a plurality of pieces of given information (for example, PHRs and CSIs) together, or may transmit these separately.

The base station (gNB) controls the transmission timing (for example, scheduling) and/or the UL transmission power based on N3/N4 reported from the UE. For example, the base station controls timing for transmitting UL data and/or the timing for transmitting HARQ-ACK feedback based on N3 reported from the UE, and controls the PHR configuration and/or the timer for triggering PHRs (also referred to as "PHR configuration information").

Figure 2A:
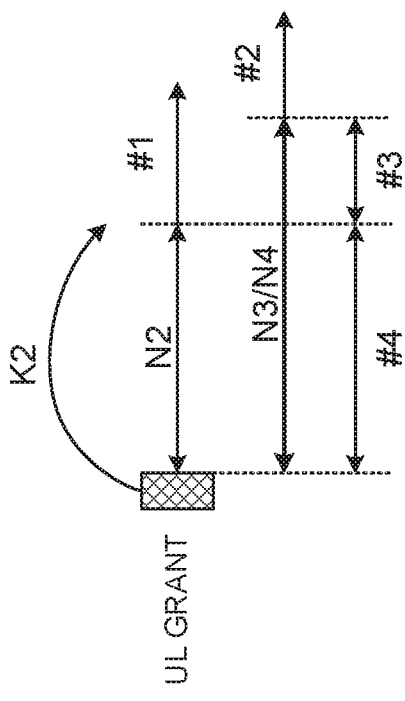
FIGS. 2A and 2B are diagrams to show examples of scheduling control based on the timing for transmitting a UL signal and the processing time for PHR/CSI.

The base station may compare N2, which corresponding to the UE processing time from receipt of a UL grant to transmission of the corresponding UL data, and N3/N4, and control transmission timing (K1/K2) and the like. Now, the method of controlling (or scheduling) transmission timing when N2 is equal to or less than N3/N4 (N2≤N3/N4) will be described below with reference to FIG. 2A. Note that FIG. 2A shows a case where UL data (PUSCH) is scheduled based on UL grants, and a case where the period (scheduling timing) from receiving a UL grant to transmitting the PUSCH is controlled as K2.

If PUSCH scheduling timing K2 comes later than N2 (case #1 of FIG. 2A), the UE can transmit UL data properly by using the PUSCH.

If PUSCH scheduling timing K2 comes later than N3/N4 (case #2 of FIG. 2A), the UE can calculate the PHR/CSI properly, and transmit the PHR/CSI properly by using the PUSCH. Also, as in case 1 above, the UE can transmit UL data properly by using the PUSCH.

If PUSCH scheduling timing K2 comes later than N2 and earlier than N3/N4 (case #3 of FIG. 2A), the UE can transmit UL data properly by using the PUSCH. Nevertheless, the UE is unable to calculate the PHR/CSI properly before transmitting the PUSCH. In this case, the UE does not transmit PHR/CSI that is triggered simultaneously with or after a UL grant, by using the PUSCH scheduled by that UL grant. Also, a configuration may be employed here in which the UE does not calculate and/or generate PHR/CSI at all.

If PUSCH scheduling timing K2 comes earlier than N2 (case #4 of FIG. 2A), the UE cannot transmit UL data properly by using the PUSCH. Furthermore, the UE is unable to calculate the PHR/CSI properly before transmitting the PUSCH.

The base station may control the timing for transmitting UL data and/or the timing for transmitting HARQ-ACK feedback, per UE, based on N3/N4 (+N1/N2) reported from the UE. Furthermore, when at least UL data transmission from the UE is implemented, the base station may apply the scheduling timing shown in cases 1 to 3. Furthermore, when implementing PHR/CSI reporting, in addition to UL data from the UE, the base station may apply the scheduling timing shown in case 2. In this way, by controlling the timing of transmission based on UE's processing capabilities, the UE is able to transmit UL data and PHR/CSI properly.

Figure 2B:
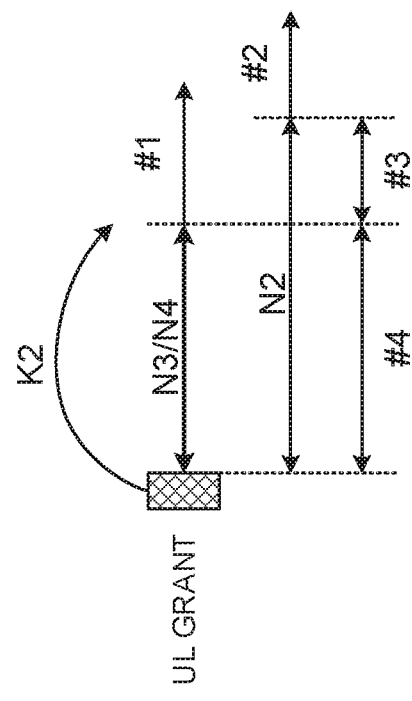

On the other hand, if N2 is larger than N3/N4 (N2>N3/N4), the base station may control scheduling, resource allocation, etc. in consideration of N2 (for example, applying case #2 of FIG. 2B). This is because, if UL data is not transmitted properly (as in cases #1, #3 and #4 in FIG. 2B), properly-calculated PHR/CSI cannot be even transmitted. To be more specific, the base station controls the period (K2), in which the UE receives a DL signal and performs UL transmission, to come after N2. In this case, the UE may transmit PHR/CSI triggered at least at or before the timing to receive a UL grant, by using the PUSCH that is scheduled by that UL grant.

As described above, by controlling the timing of transmission based on UE's processing capabilities for given information, it is possible to transmit this given information properly. In addition, sufficient processing time can be reserved when the UE calculates (or generates) given information, so that the processing load induced by the calculation and/or the like can be reduced.

Second Example

A second example of the present invention describes the case of controlling whether or not to transmit the given information and/or the content of the given information to be transmitted based on UE processing capability information for given information and timing for transmitting UL data and/or HARQ-ACK.

Now that, an example case will be described below, in the following description, in which the timing for transmitting a UL signal (UL data and/or HARQ-ACK) (K1 and/or K2) is configured to come earlier than a given value (for example, N3/N4) (for example, case 3 of FIG. 2A). In addition, the same is applicable as long as the timing of transmission is configured without considering UE's processing capabilities for given information.

<Control as to Whether or not to Transmit Given Information>

If a UL signal (for example, PUSCH) is scheduled to be transmitted earlier than a given value, even if PHR/CSI is triggered then, UE cannot reserve time for processing PHR/CSI before transmitting the UL signal. Thus, the UE does not perform UL transmission when the timing for scheduling UL transmission is configured to come earlier than a given value.

For example, at a timing where a UL signal is scheduled, the UE may transmit only UL data without transmitting PHR/CSI. Alternatively, the UE may not transmit UL data (does not perform UL transmission at all), as well as PHR/CSI. In this case, the UE may not calculate (or generate) PHR/CSI at all. This can reduce the load of transmission processes in the UE.

When UL data is not transmitted from the UE, or when no triggered PHR/CSI is contained in a UL signal, the base station may control retransmission by changing the scheduling timing (for example, by configuring the scheduling timing to come later). By this means, upon retransmission, the UE can calculate and transmit PHR/CSI properly.

<Control of Transmission Content of Given Information>

If the timing for scheduling a UL signal is configured to come earlier than a given value, the UE may change the content of given information to transmit by using this UL signal and transmit this. That is, the UE selects the content of PHR/CSI based on the scheduling timing. Now, a case will be described below in which the given information is a PHR and a case in which the given information is CSI will be described both.

[PHR]

The UE calculates/generates PH when the timing for scheduling a UL signal is configured to come earlier than a given value (for example, as in case 3 of FIG. 2A), on the assumption that PUSCH and/or PUCCH are not transmitted. For example, the UE calculates and transmits a virtual PH type 1 and/or a virtual PH type 2 on the assumption that no PUSCH and/or PUCCH are transmitted. Note that, to calculate PH, mathematical equations defined in existing LTE may be used, or newly defined mathematical equations may be used. For example, regardless of how many PUSCH/PUCCH resources (for example, PRBs) are actually scheduled, a PHR for when PUSCH and/or PUCCH are transmitted using a given number of resources, may be calculated/generated.

When multiple CCs are configured (for example, when CA is executed), the UE controls the calculation (or generation) of PHs on a per CC basis. For example, the UE calculates a virtual PH for a CC where the UL signal scheduling timing is configured to come earlier than a given value. On the other hand, for a CC where the UL signal scheduling timing is configured to come at the same time or later than a given value, the UE may calculate and transmit real PH type 1 and/or real PH type 2 on the assumption that PUSCH and/or PUCCH are transmitted. By this means, it is possible to flexibly control the contents of PHRs to transmit per CC, in accordance with the scheduling timing configured for each CC.

Alternatively, when the timing for scheduling a UL signal is configured to come earlier than a given value, the UE may calculate one of PH type 1 and PH type 2 as a real PH and the other one as a virtual PH. For example, the UE may calculate PH type 2 as a real PH and PH type 1 as a virtual PH on the assumption that PUCCH is transmitted and PUSCH is not transmitted. Accordingly, even when the timing for transmitting an HARQ-ACK in response to a PUSCH scheduled based on a UL grant and the timing for transmitting an HARQ-ACK in response to a PDSCH scheduled based on a DL assignment are different, the UE can properly calculate a real PH and a virtual PH according to the respective timings, so that the base station can learn the transmission power accurately.

[CSI]

If the timing for scheduling a UL signal is configured to come earlier than a given value, the UE may include and transmit the latest CSI that has already been measured, for the CSI measurement signal (or the CSI process), in this UL signal. In this case, the base station can control scheduling, resource allocation and the like based at least on the latest CSI information held by the UE.

Alternatively, when the timing for scheduling a UL signal is configured to come earlier than the given value, the UE may include a given value, which is provided in advance, in a UL signal, and transmit this. As for the given value, information to indicate that CSI (for example, CQI) is out of range (OOR), or a given CSI value that is configured in advance may be used.

When the base station receives an OOR, the base station can recognize that the UE could not properly calculate the CSI. By this means, when the base station triggers A-CSI again, control such as configuring the scheduling timing later can be implemented. Also, when the base station receives a given CSI value, the base station can control the scheduling conditions and the like, based at least on a given CSI value, and recognize that there is a possibility that the UE has failed to calculate CSI properly.

When multiple CCs are configured (for example, when CA is executed), the UE controls A-CSI calculation/generation on a per CC basis. For example, in a CC where the timing for scheduling a UL signal is configured to come earlier than a given value, the UE transmits either the latest CSI held by the UE, an OOR, or a given CSI value that is configured in advance. On the other hand, in a CC where the timing for scheduling a UL signal is configured to come at the same time as or later than a given value, the UE may include and transmit CSI that is calculated based on a CSI trigger, in UL transmission. By this means, it is possible to flexibly control the contents of CSI to transmit per CC, in accordance with the scheduling timing configured for each CC.

Alternatively, if the timing for scheduling a UL signal is configured to come earlier than a given value, the UE may be configured so that whether or not to transmit CSI and/or the content to transmit are determined autonomously on the UE side.

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 3:
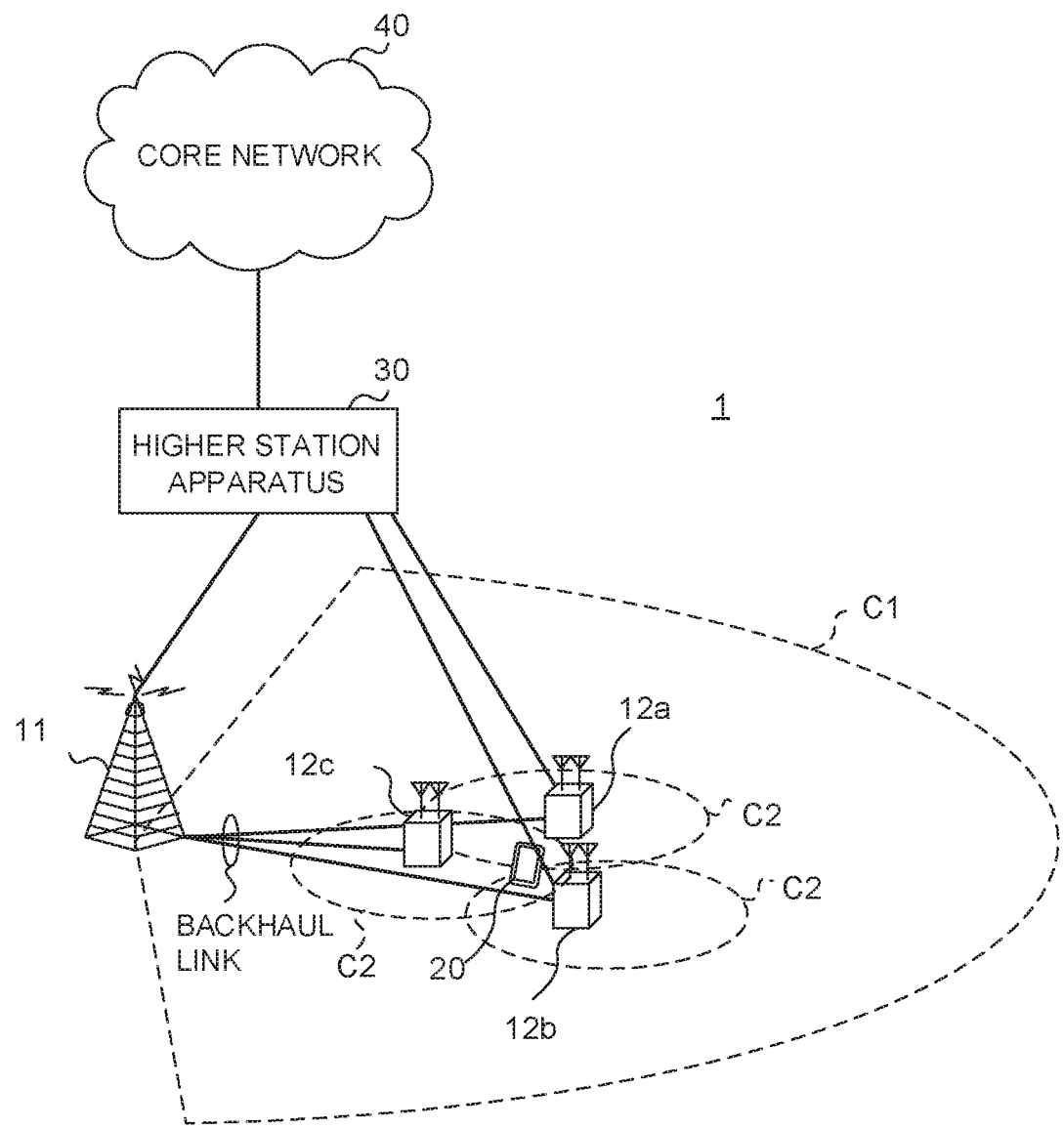
FIG. 3 is a diagram to show an exemplary schematic structure of a radio communication system according to one embodiment of the present invention.

FIG. 3 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may run CA or DC by using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

The radio base station 11 and a radio base station 12 (or 2 radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10." unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 4:
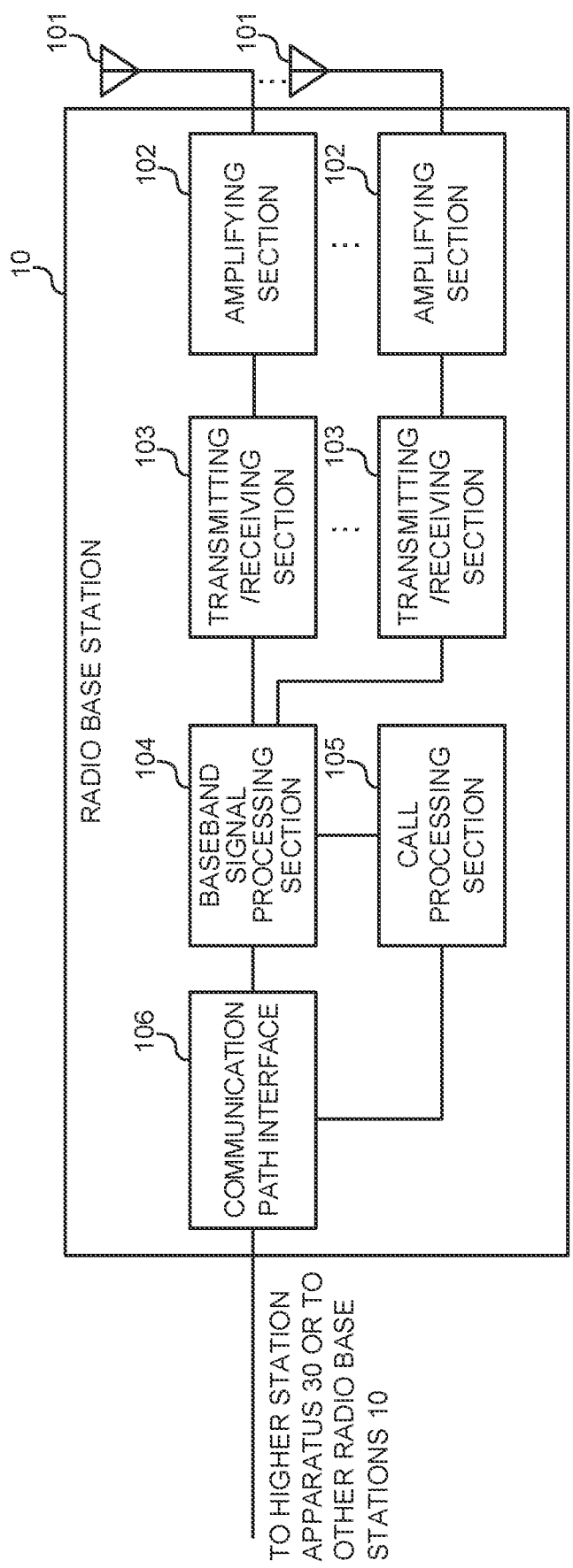
FIG. 4 is a diagram to show an exemplary overall structure of a radio base station according to one embodiment of the present invention.

FIG. 4 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control. MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit a DL signal (which may be, for example, downlink control information carrying a UL transmission command (for example, a UL grant) and/or a HARQ-ACK transmission command, downlink data, etc.). The transmitting/receiving sections 103 receive given information (for example, PHR, CSI, etc.) by using the UL channel that is scheduled (or allocated) the first period after the DL signal is received.

The transmitting/receiving sections 103 may receive information about at least one of the processing time for HARQ-ACK in response to DL data (PDSCH) (N1), the processing time for UL data (N2), and the processing time for PH (N3), and the processing time for CSI (N4), as UE capability information.

Figure 5:
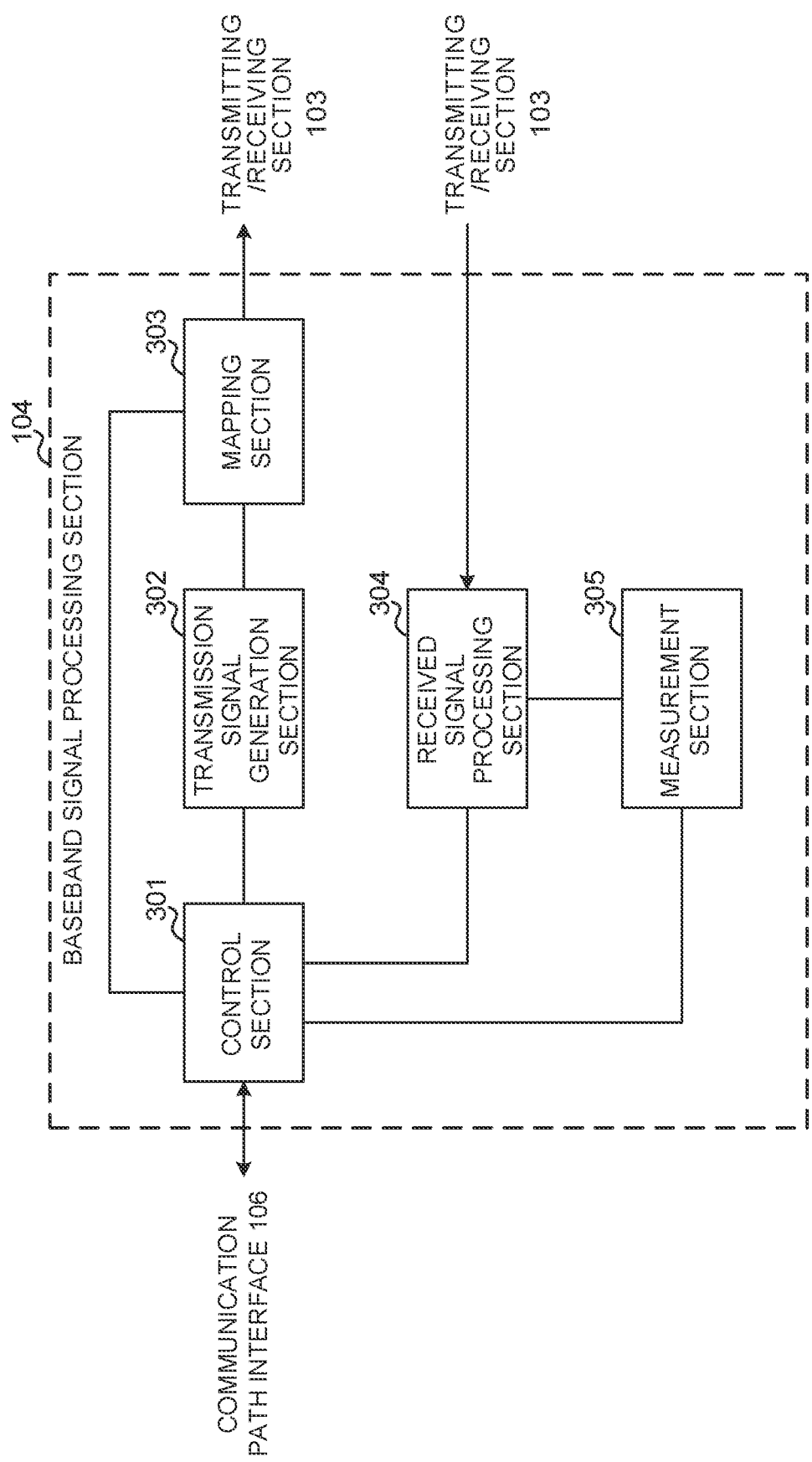
FIG. 5 is a diagram to show an exemplary functional structure of a radio base station according to one embodiment of the present invention.

FIG. 5 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 controls the timing for transmitting UL data and/or HARQ-ACK based on information reported from UE (for example, information related to at least one of the processing time for HARQ-ACK in response to DL data (PDSCH) (N1), the processing time for UL data (N2), the processing time for PH (N3) and the processing time for CSI (N4)).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, downlink data signals are subjected to the coding process, the modulation process and other processes based on coding rates, modulation schemes and the like that are determined based on channel state information (CSI) and the like from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI), and so on. The measurement results may be output to the control section 301.

(User Terminal)

Figure 6:
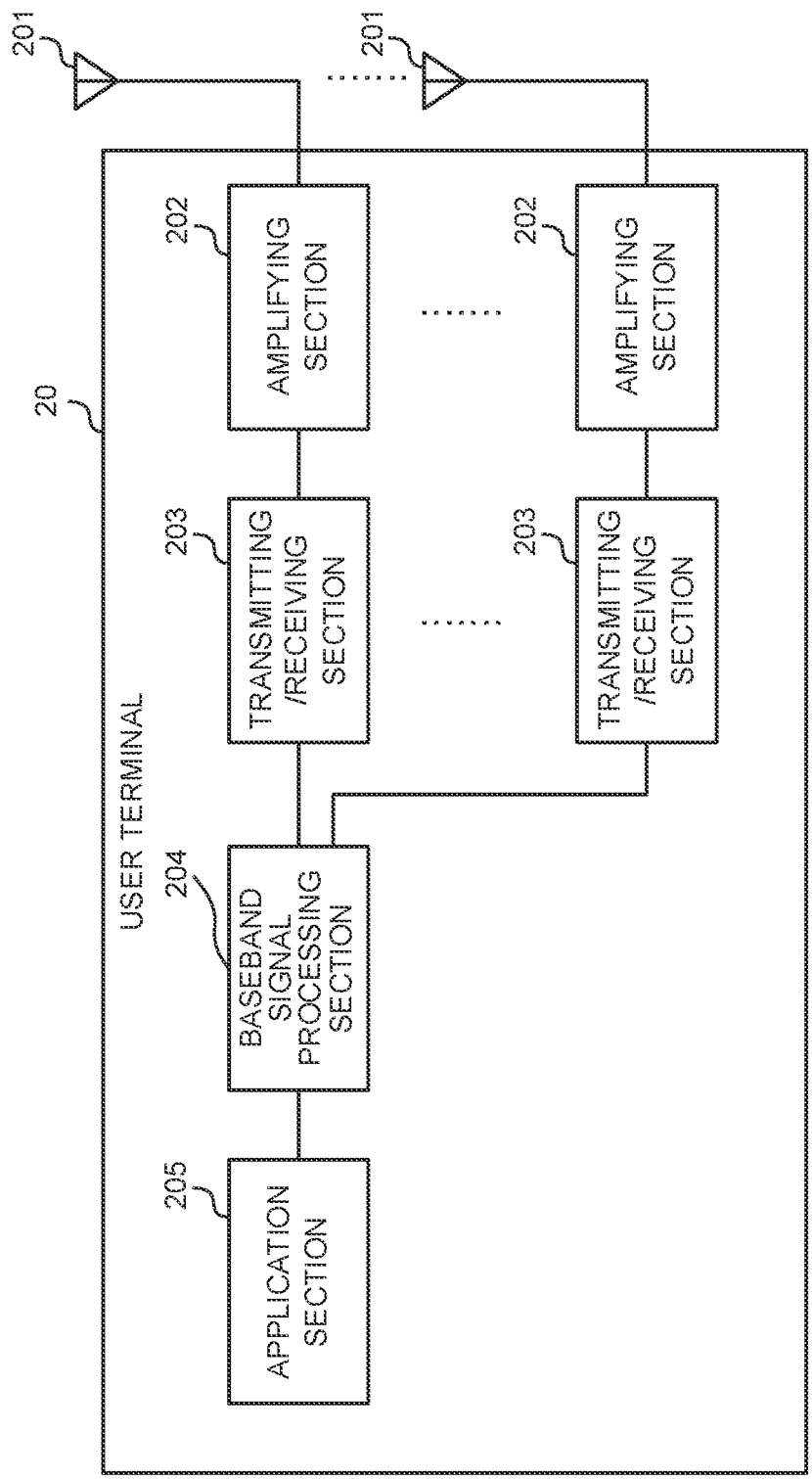
FIG. 6 is a diagram to show an exemplary overall structure of user terminal according to one embodiment of the present invention.

FIG. 6 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 receive a DL signal (which may be, for example, downlink control information carrying a UL transmission command (for example, a UL grant) and/or a HARQ-ACK transmission command, downlink data, etc.). The transmitting/receiving sections 203 transmit given information (for example, PHR, CSI, etc.) by using the UL channel that is scheduled (or allocated) the first period after the DL signal is received.

The transmitting/receiving sections 203 may transmit information about at least one of the processing time for HARQ-ACK in response to DL data (PDSCH) (N1), the processing time for UL data (N2), and the processing time for PH (N3), and the processing time for CSI (N4), as UE capability information.

Figure 7:
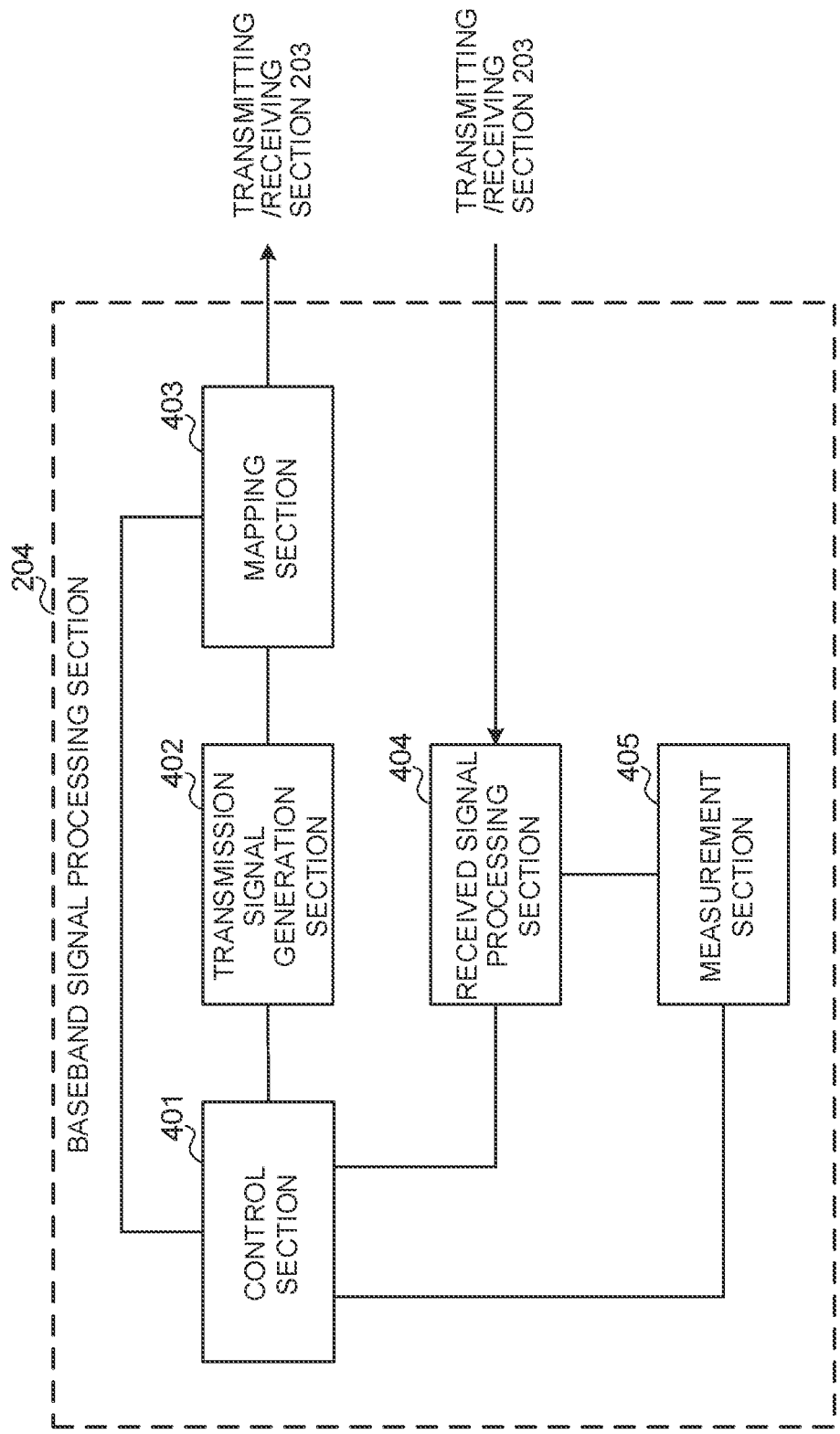
FIG. 7 is a diagram to show an exemplary functional structure of user terminal according to one embodiment of the present invention.

FIG. 7 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 controls transmission of a UL channel that is scheduled a first period after a DL signal is received, and transmission of given information. For example, the control section 401 controls at least one of whether or not to transmit given information by using a UL channel, the content of given information to transmit in the UL channel, and the first period, based on the first period and the second period, which is needed to generate the given information.

Also, when the first period is shorter than a given value (for example, a second period (N3/N4)), the control section 401 exerts control so that the given information is not transmitted in the UL channel. Alternatively, when the first period is shorter than a given value and the given information is a power headroom report, the control section 401 may generate a virtual power headroom report on the assumption that at least no uplink shared channel is transmitted. Alternatively, if the first period is shorter than a given value and the given information is channel state information, the control section 401 may exert control so that channel state information that has been measured prior to receipt of the DL signal, or a given value, is transmitted.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by 1 piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 8:
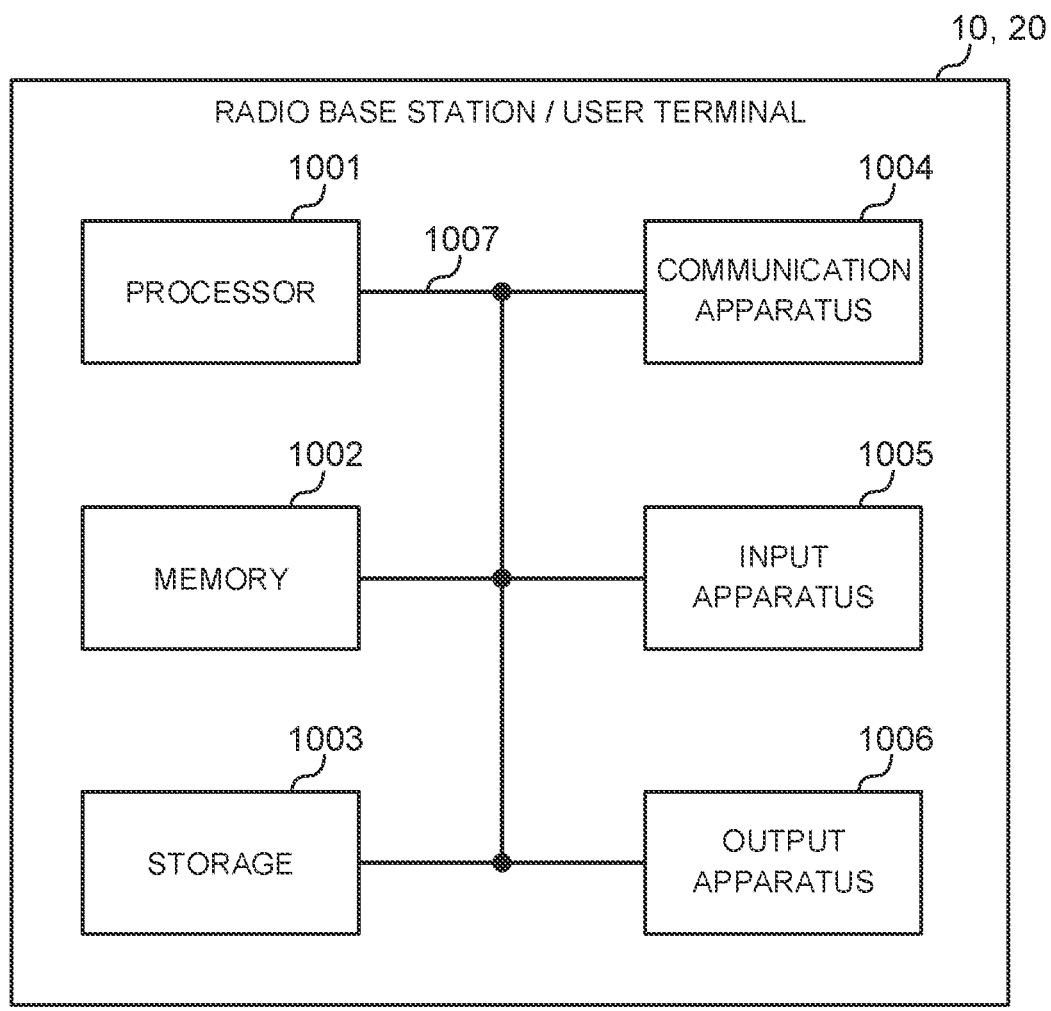
FIG. 8 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 8 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot." a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minslots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or minislot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "minislot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minslots) may be the minimum time unit of scheduling. Also, the number of slots (the number of minslots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe." and so on. A TTI that is shorter than a normal TTI may be referred to as a "shortened TTI," a "short TTI," a "partial TTI" (or a "fractional TTI"), a "shortened subframe," a "short subframe," a "minislot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))." a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minslots, symbols and so on described above are merely examples. For example, configurations pertaining to the number of subframes included in a radio frame, the number of slots included per subframe or radio frame, the number of minslots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message. RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a given value).

Software, whether referred to as "software," "firmware." "middleware," "microcode" or "hardware description language." or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station." "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal." "user equipment (UE)" and "terminal" may be used interchangeably. A base station may be referred to as a "fixed station," "NodeB," "eNodeB (eNB)," "access point," "transmission point." "receiving point," "femto cell," "small cell" and so on.

A mobile station may be referred to, by a person skilled in the art, as a "subscriber station," "mobile unit," "subscriber unit," "wireless unit," "remote unit." "mobile device," "wireless device." "wireless communication device." "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives downlink control information that triggers channel state information (CSI) reporting using an uplink shared channel; and
   a processor that controls the CSI reporting based on:
      transmission timing of the uplink shared channel, and
      a timing based on a number of symbols required for calculating the CSI,
   wherein, when the CSI reporting is triggered, if a start position to transmit the CSI reporting starts earlier than a timing based on the number of symbols required for calculating the CSI, the processor can control not to transmit the uplink shared channel.

2. The terminal according to claim 1, wherein when the CSI reporting is triggered, if a start position to transmit the CSI reporting starts earlier than the timing based on the number of symbols required for calculating the CSI, the processor can control not to perform the CSI reporting.

3. A radio communication method for a terminate comprising:
   receiving downlink control information that triggers channel state information (CSI) reporting using an uplink shared channel; and
   controlling the CSI reporting based on:
      transmission timing of the uplink shared channel, and
      a timing based on a number of symbols required for calculating the CSI,
   wherein, when the CSI reporting is triggered, if a start position to transmit the CSI reporting starts earlier than a timing based on the number of symbols required for calculating the CSI, the terminal can control not to transmit the uplink shared channel.

4. A system comprising a base station and a terminal, wherein:
   the base station comprises:
      a transmitter that transmits downlink control information that triggers channel state information (CSI) reporting using an uplink shared channel; and
   the terminal comprises:
      a receiver that receives the downlink control information; and
      a processor that controls the CSI reporting based on:
         transmission timing of the uplink shared channel, and
         a timing based on a number of symbols required for calculating the CSI,
      wherein, when the CSI reporting is triggered, if a start position to transmit the CSI reporting starts earlier than a timing based on the number of symbols required for calculating the CSI, the processor can control not to transmit the uplink shared channel.

* * * * *